J. J. O'NEIL.
RESILIENT WHEEL.
APPLICATION FILED JULY 31, 1919.
1,330,492. Patented Feb. 10, 1920.
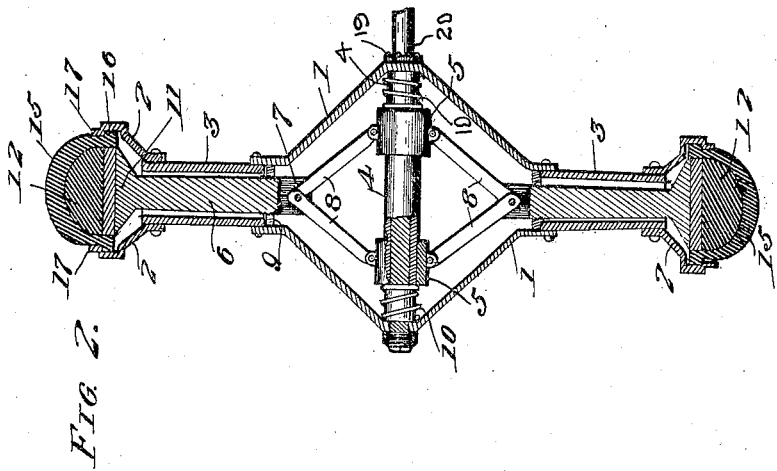
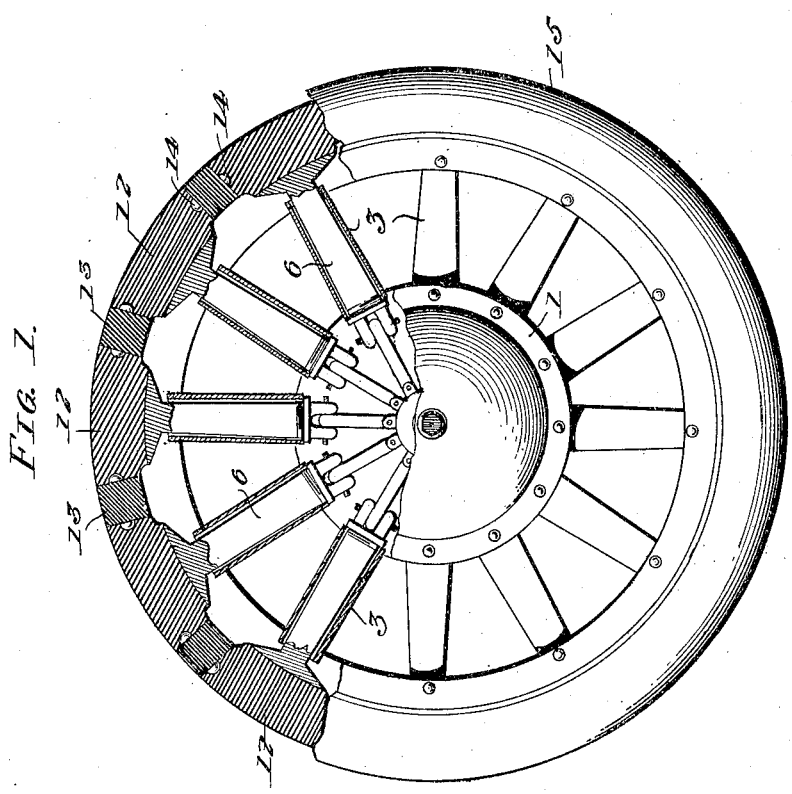
WITNESSES
INVENTOR
J. J. O'NEIL,
BY
ATTORNEYS

UNITED STATES PATENT OFFICE.

JAMES JOSEPH O'NEIL, OF PITTSTON, PENNSYLVANIA.

RESILIENT WHEEL.

1,330,492.  Specification of Letters Patent.  Patented Feb. 10, 1920.

Application filed July 31, 1919. Serial No. 314,462.

*To all whom it may concern:*

Be it known that I, JAMES J. O'NEIL, a citizen of the United States, and a resident of Pittston, in the county of Luzerne and State of Pennsylvania, have invented certain new and useful Improvements in Resilient Wheels, of which the following is a specification.

My invention is an improvement in resilient wheels, and has for its object to provide a wheel of the character specified wherein the wheel is so arranged that under shock and jar it may decrease in diameter and wherein spring mechanism is provided for absorbing shock and jar during the decrease in diameter of the wheel.

In the drawings:

Figure 1 is a side view of the improved wheel, with parts broken away;

Fig. 2 is a vertical section.

In the present embodiment of the invention the improved wheel consists of a casing composed of a hollow hub portion 1, a rim portion 2 and tubular casings 3 connecting the hub and the rim. The hub portion as shown more particularly in Fig. 2 is composed of two oppositely arranged dished or concave plates, and the ends of the tubular casings 3 are received between the plates of the hub portion and are riveted thereto, as shown. The rim portion is composed of two rings, one at each face of the wheel, and the outer ends of the tubular casings are received between these rings and are riveted, as shown in Fig. 2.

The hub portion carries at the axis of the wheel a hub 4 in the form of a sleeve or tubular casing, and upon this hub there is mounted a pair of sleeves 5, the said sleeves being slidable on the hub, but constrained to turn therewith. In each of the tubular casings 3 there is mounted a spoke 6, and each spoke is provided at its inner end with a pair of lugs 7 spaced apart from each other. A pair of levers 8 connects the inner end of each spoke and the sleeves 5, the levers having their outer ends received between the lugs 7 and being pivoted at their inner ends to the sleeve. The arrangement is such that when the spokes are moved inwardly the sleeves 5 will be moved away from each other, while when the spokes are moved outwardly the sleeves will be moved together.

A nut 9 is threaded on to each spoke at the inner end of the tubular casing 3. Coil springs 10 encircle the hub between the outer ends of the sleeves and the plates of the hub portion and act normally to press the sleeves 5 toward each other, that is, to retain the spokes in outermost position.

At its outer end each spoke has a head 11, which supports a tread block 12 of rubber or the like, the said blocks being held on the heads in any suitable or desired manner, and it will be noticed that the said blocks are curved to correspond with the curve of the wheel and are spaced apart at their adjacent ends to receive between them bearing washers 13 also of rubber, and detachably connected with the blocks 12.

The washers have rounded buttons or projections 14 at their opposite faces which engage within recesses or depressions in the tread blocks. The washers and the tread blocks make a complete tread for the wheel, and by removing the washers any particular tread block may be taken out for replacement or repair. The tread may be completed by a casing 15 which is arranged about the tread blocks and washers and has at its opposite side edges holding beads 16 which are engaged by overlying flanges 17 on the rim rings.

In operation, when the spindle is moved eccentrically with respect to the wheel, the spokes will be also moved inwardly and the sleeves 5 will be moved away from each other against the resistance of the springs 10, thus cushioning shock or jar.

Referring to Fig. 2, it will be seen that the spindle 4 has a reduced portion extending through the hub portion 1 at the inner side of the wheel and a collar 19 is secured to the hub portion outside the same, by means of rivets 20, reinforcing the hub portion at this point.

I claim:

1. A resilient wheel comprising a hub and a sectional rim, spokes connected with the rim sections, collars mounted to slide on the hub, and links connecting the inner end of each spoke with the collars, said collars being spring supported against outward movement away from each other, and a housing for the hub, the inner surface of the rim and the spokes, said rim sections being of resilient material.

2. A resilient wheel comprising a hub and a sectional rim, spokes connected with the rim sections, collars mounted to slide on the hub, and links connecting the inner end of each spoke with the collars, said collars being spring supported against outward movement away from each other, and a housing for the hub, the inner surface of the rim and the spokes.

3. A resilient wheel comprising a hub and a sectional rim, spokes connected with the rim sections, collars mounted to slide on the hub, and links connecting the inner end of each spoke with the collars, said collars being spring supported against outward movement away from each other.

4. A wheel comprising a hub, a series of rim sections, spokes connected with the alternate sections, collars mounted to slide on the hub and spaced apart from each other, links connecting the spokes with the collars, springs pressing the collars toward each other, a flexible tread covering for the rim sections, and a housing for the inner surface of the rim sections, the spokes and the hub, and connected with the tread covering.

5. A wheel comprising a hub, a series of rim sections, spokes connected with the alternate sections, collars mounted to slide on the hub and spaced apart from each other, links connecting the spokes with the collars, and springs pressing the collars toward each other.

JAMES JOSEPH O'NEIL.